(12) United States Patent
Jackson et al.

(10) Patent No.: US 12,099,744 B2
(45) Date of Patent: Sep. 24, 2024

(54) REDUCED DATA REPRESENTATION MEMORY CONTROLLER AND RELATED CHIPLET SETS

(71) Applicant: Palo Alto Research Center Incorporated, Palo Alto, CA (US)

(72) Inventors: Warren Jackson, San Francisco, CA (US); Aleksandar Feldman, Santa Cruz, CA (US); Alexandre Perez, San Mateo, CA (US); Johan de Kleer, Los Altos, CA (US)

(73) Assignee: Xerox Corporation, Norwalk, CT (US)

( * ) Notice: Subject to any disclaimer, the term of this patent is extended or adjusted under 35 U.S.C. 154(b) by 125 days.

(21) Appl. No.: 17/712,137

(22) Filed: Apr. 2, 2022

(65) Prior Publication Data
US 2023/0315333 A1    Oct. 5, 2023

(51) Int. Cl.
*G06F 3/06*         (2006.01)
(52) U.S. Cl.
CPC ............ *G06F 3/0655* (2013.01); *G06F 3/061* (2013.01); *G06F 3/0673* (2013.01)
(58) Field of Classification Search
CPC ...... G06F 3/0655; G06F 3/061; G06F 3/0673; G06F 13/1668; G06F 15/7821
See application file for complete search history.

(56) References Cited

U.S. PATENT DOCUMENTS

| | | | |
|---|---|---|---|
| 2015/0317282 A1 | 11/2015 | Avron et al. | |
| 2018/0165248 A1* | 6/2018 | Valley | G06E 1/00 |
| 2018/0197471 A1* | 7/2018 | Rotzoll | G09G 3/2003 |
| 2019/0317461 A1* | 10/2019 | Pothukuchi | G05B 15/02 |
| 2020/0194370 A1* | 6/2020 | Radauscher | H01L 23/5254 |
| 2022/0107867 A1* | 4/2022 | Wu | G06F 11/1068 |
| 2022/0391172 A1* | 12/2022 | Imber | G06N 3/063 |

OTHER PUBLICATIONS

Halko et al., Finding Structure With Randomness: Probabilistic Algorithms for Constructing Approximate Matrix Decompositions, arXiv:0909.4061v2; SIAM Rev., Survey and Review section, vol. 53, No. 2, pp. 217-288, Jun. 2011.
Drineas et al., RandNLA: Randomized Numerical Linear Algebra; DOI:10.1145/2842602; Communications of the ACM vol. 59, Issue No. 6; Jun. 2016.
Wikipedia, Low-density parity-check code, downloaded Apr. 2, 2022.

\* cited by examiner

*Primary Examiner* — Zhuo H Li
(74) *Attorney, Agent, or Firm* — Jose Getmax; Fleit Intellectual Property Law

(57) ABSTRACT

A transform memory controller is described herein wherein the transform memory controller comprises logic elements configured to perform desired transform operations on data that flows to-and-from conventional computer memory elements. The transform operations are configured to perform operations on such data without the need for such data to travel to-and-from the conventional computer memory element via the processor (e.g., Central Processing Unit (CPU)) of the computer system. Several desirable transform operations are herein disclosed.

18 Claims, 12 Drawing Sheets

FIG. 9

REDUCED DATA REPRESENTATION MEMORY CONTROLLER AND RELATED CHIPLET SETS

BACKGROUND

Conventional computer architectures (e.g., the von Neumann architecture) are well known in the art. FIG. 1 depicts such one such architecture (100) which depicts in block diagram form how such a computer is constructed. A processing unit 111 (e.g., CPU, GPU or the like) is in electronic communication with various stages of memory-for example, random access memory (RAM 114) and read only memory (ROM 116). There may, in addition, be fast memory stores, such as cache memory, in which recent data references may be stored. Cache memory operates on the principle that recently accessed data may likely be accessed again the near future, so it is efficient to keep such memory in the fastest storage possible.

FIG. 2 depicts one such conventional hierarchy of memory—i.e., from fastest access (registers and cache) to slowest (Storage Class Memory (SCM) and Hard Disk Drive (HDD)). However, in today's computing environment, data movement now takes more energy, time, and silicon real estate than computation. FIG. 3 is a graph of energy required to move data for a 64-bit operation/computation, as performed on different computer systems. As may be seen, data movement is depicted as overtaking computation as the most dominant cost of a system in terms of energy consumption and time delay. As may be further seen in FIG. 3, the cost of moving a 64-bit operand a mere 5 mm across a chip exceeds that of a floating point operation that uses that operand (as indicated on line 302).

As seen, off chip data movement costs vastly more energy and more CPU cycles. Consequently, if data is being moved such as to-or-from main memory, it would be desirable if computations on that data could be performed with little silicon/power/time costs. It should be appreciated that 64-bit operations are merely exemplary and that other operations of other dimensions are contemplated.

In addition, some circuitries are now reaching such density that if all the circuits are on at the same time, the energy flux density may exceed that of a nuclear reactor. Hence, the notion of "dark silicon", i.e. circuits which are on only part of the time, is acceptable. Thus, it would be desirable if a memory controller—which performs operations that are invoked only part of the time—can perform useful operations which do not add significant time delay or energy costs during essential but energy and time delay intensive data streams into and out of memory. It would also be desirable that the operations are flexible and require a common simple architecture.

SUMMARY OF THE APPLICATION

Several embodiments of the present application comprising systems and methods of reduced data representation memory controllers and related chiplet sets are disclosed.

In the several embodiments, a data transformation is performed on the data as it is passing through the traditional memory controller electronics. In one embodiment, a transform may be construed as a useful, universal data transformation which can be performed by a memory side controller. The memory controller being a part of a computer system further comprising a central processor and a hierarchy of computer memory elements, the transform memory controller comprising: an input, the input receiving data signals associated with the computer memory elements; a set of logic and arithmetic elements, the set of logic elements configured to perform a transform operation on the data signals associated with the computer memory element wherein the transform operation performs a desired computation on the data signals without the need of the desired computation being performed by the CPU of the computer system; and an output, the output of the transform operation sends results of the computation to the computer memory elements.

In another set of embodiments, a method for performing transform operations on data residing in desired levels of slower memory elements, the steps of said method comprising: receiving an instruction for an operation on data in the computer system; determining the cost of the operation on the data to be performed at the central processor; and if the cost of the operation is above a desired threshold, then performing the data operation at the transform memory controller instead of at the central processor.

Other features and advantages of the present system are presented below in the Detailed Description when read in connection with the drawings presented within this application.

BRIEF DESCRIPTION OF THE DRAWINGS

FIGS. 9A, B and C is a collection of transform matrices that may be applied to various data that affect a desired processing, as made in accordance with the principles of the present application.

DETAILED DESCRIPTION

Figure 1:
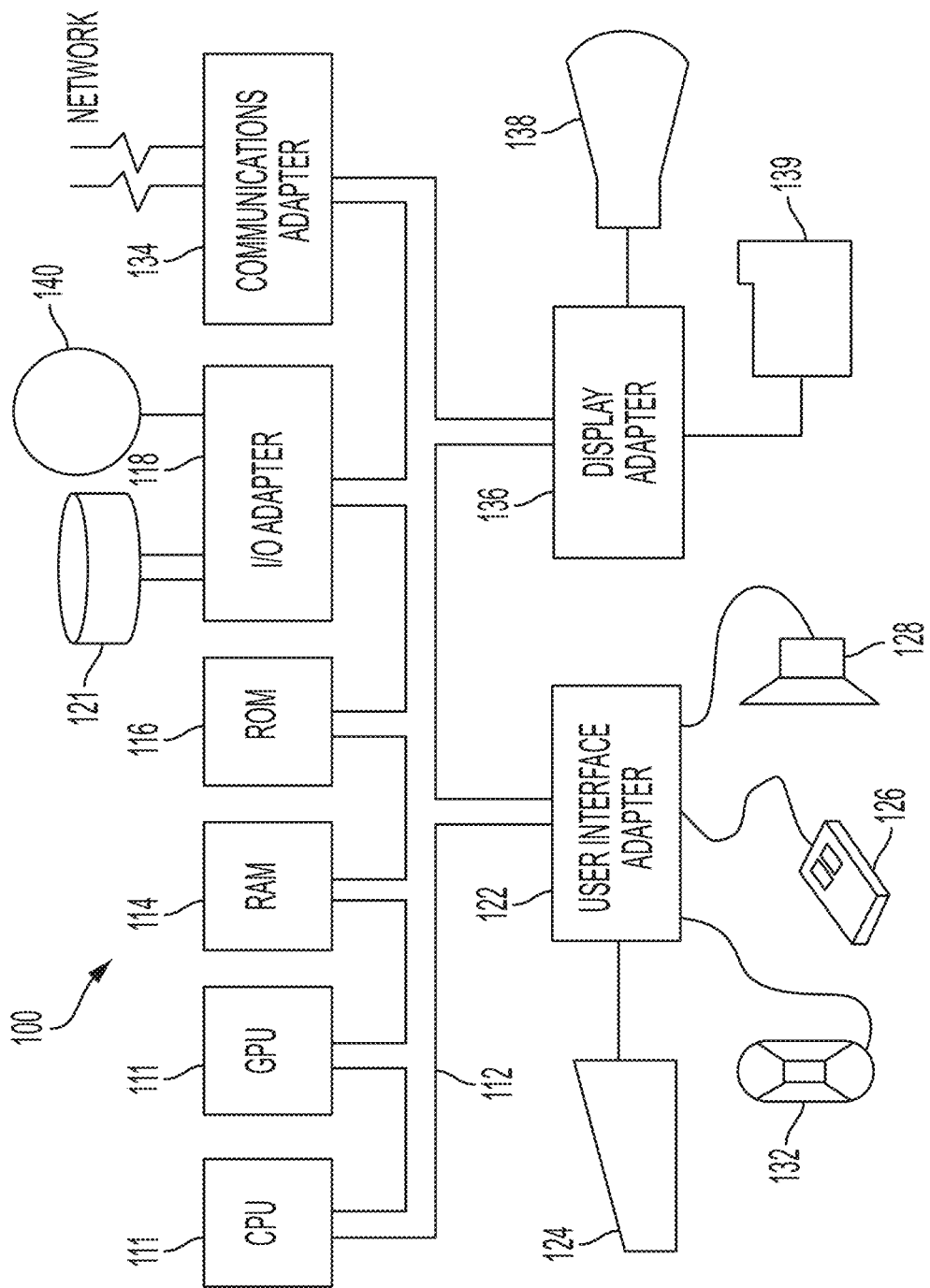
FIG. 1 shows a conventional computer architecture, as known in the art.
Figure 2:
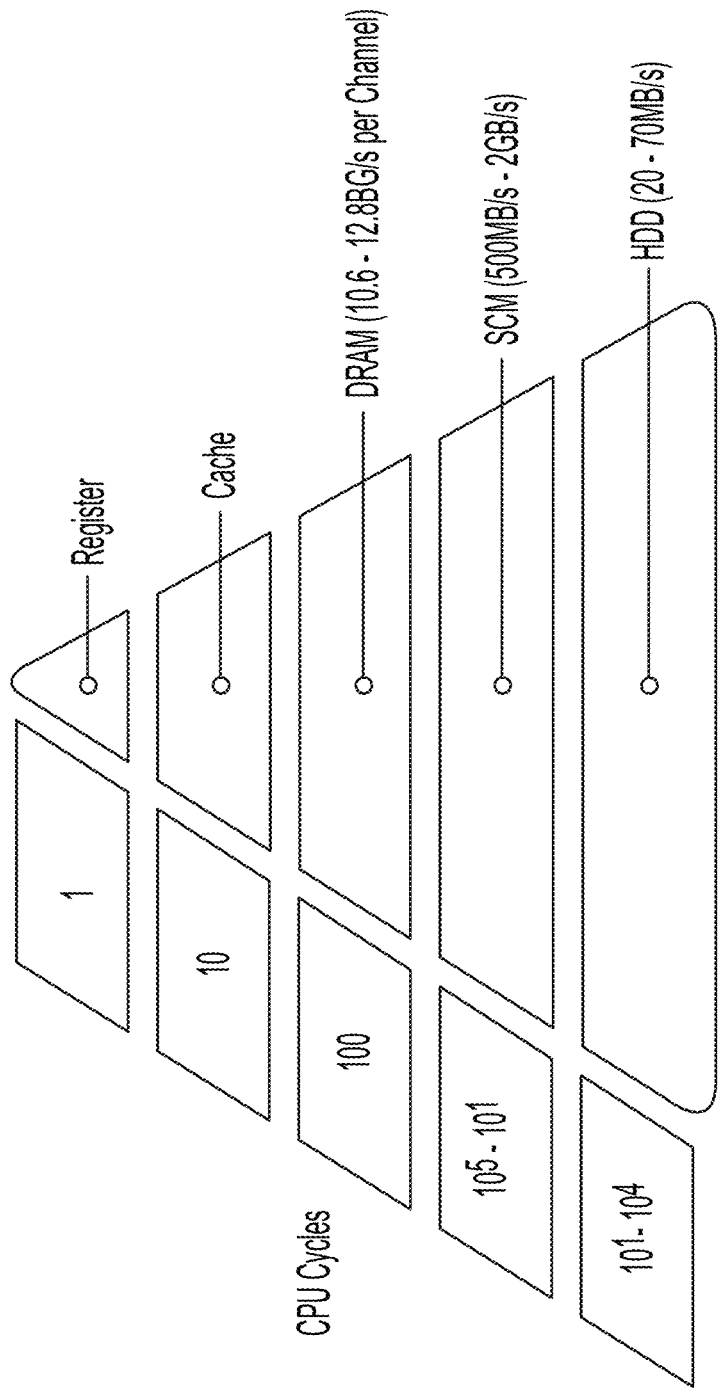
FIG. 2 depicts a conventional hierarchy of computer memory, from fastest access to slowest access speeds, as is known in the art.
Figure 3:
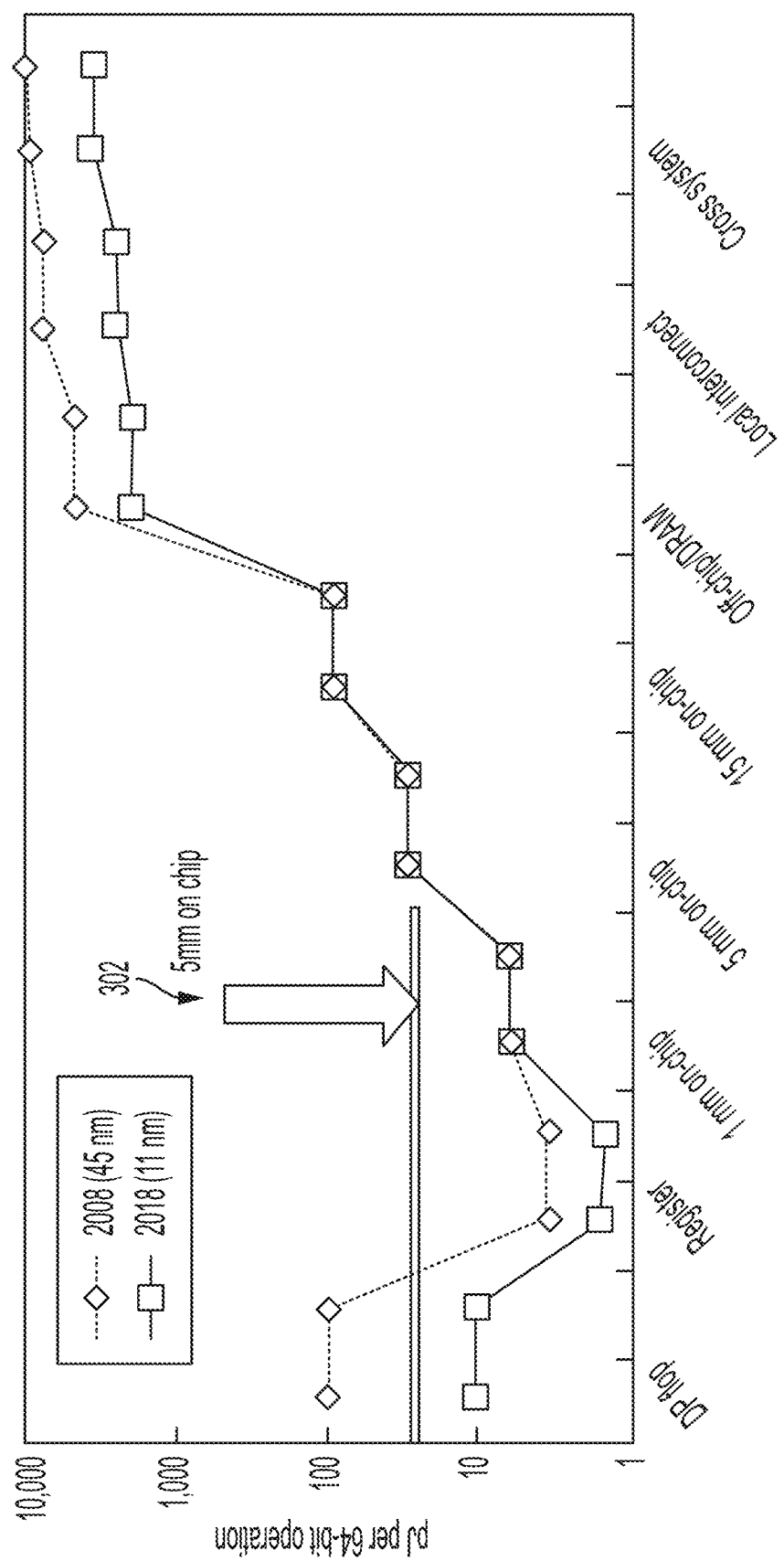
FIG. 3 is a graph depicting the amount of energy needed to move data across a distance on a typical chip.

The following description is presented to enable any person skilled in the art to make and use the embodiments, and is provided in the context of a particular application. Various modifications to the disclosed embodiments will be readily apparent to those skilled in the art, and the general principles defined herein may be applied to other embodiments and applications without departing from the spirit and scope of the present disclosure. Thus, the present application is not limited to the embodiments shown, but is to be accorded the widest scope consistent with the principles and features disclosed herein.

Overview

As mentioned, data movement now takes more energy, time, and silicon real estate than computation. Thus, a memory controller which performs operations that are invoked only part of the time can perform useful operations as the data streams into and out of memory. Various embodiments of the present application describe many useful functions that a memory controller can perform in addition to the usual functions performed by the previous memory controllers. Such usual functions of a typical memory controller may include the following functions—read by address, read by content, write by address, write by content, error correction, and more recently, encryption/decryption. In addition, there also are various addressing modes such as block transfer, streaming, or page transfer.

In one embodiment of the present application, the memory controller functionality may be expanded to perform operations in parallel with such basic memory functions—which may comprise useful functions improving the overall system performance. These operations can be programmatically invoked on the data as it is coming into and out of memory or to eliminate the transfer to the CPU all together. In some embodiments, the results of these operations may be stored in other parts of main memory or in memory controller registers. In such cases, the memory controller functions may shorten data flow paths from memory to the CPU, may process data flows from other data sources, and process data flows to and from the edge—e.g., sensors and/or actuators.

In one embodiment, the results of these operations can be stored in other parts of main memory or in memory controller registers. In the context of the present application, the term "transform" operations/algorithms/firmware and/or hardware refer to additional and/or auxiliary functions and/or hardware that may be performed to reduce the cost of moving data to-and-from storage to CPU In many embodiments, it suffices for the purposes of the present application that the operations on data of a desired size/dimension be costly in terms of energy consumption and time delay that it would be desirable to perform the data operations in a transform memory controller as described herein—as opposed to transferring the data signals to the processor (e.g., CPU, GPU, etc.) of the computer system to perform. In many embodiments, the transform memory controller may be configured to perform operations on data signals that would have a threshold (either actual or predicted) energy cost and/or time delay.

Figure 4:
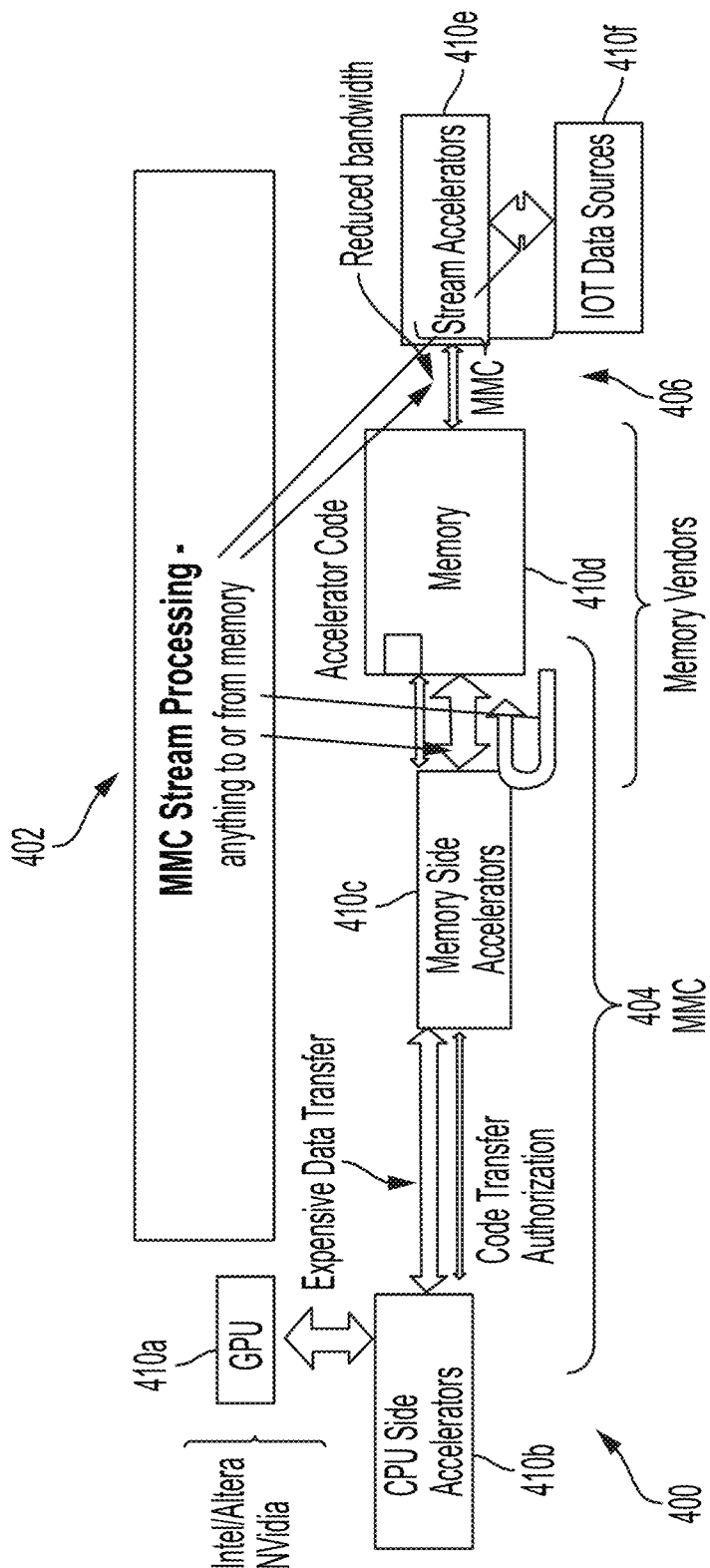
FIG. 4 shows one embodiment of an architecture of a memory controller made in accordance with the principles of the present application.

FIG. 4 shows one possible high-level data transform architecture 400—and the data flow therethrough—as made in the context of the present application. As may be seen, several hardware modules (e.g. 410a (GPU), 410b (CPU Side Accelerators), 410c (Memory Side Accelerators), 410d (Memory), 410e (Stream Accelerators) and 410f (10T Data Sources)) may be either off-the-shelf (OTS) components that may be modified to perform transform memory transformation (MT) operations/algorithms, or there may additional transformation hardware that is added to standard components that affect transform memory operations. The memory controller functions can shorten data flow paths from memory to the CPU and/or can process data flows from other data sources, and process data flows to and from the edge i.e., from sensors and/or actuators.

As may be seen in FIG. 4, there are functional blocks—e.g., 402, 404 and 406, where transformation processing and/or hardware may be advantageously applied to this architecture. In addition, FIG. 4 describes some embodiments of the transform data flow. By performing the memory side functions as indicated, data movement may be minimized. In many embodiments described herein, these memory side operations are sufficiently useful such that the benefits of the additional functionality outweigh the cost. In addition, many embodiments describe functionality that is broadly useful for many types of data.

In many embodiments, the useful operations depend on the application. Because the costs of designing, fabricating, testing, and packaging these DRAM memory arrays is very expensive, the ability to customize the memory side computations could be quite useful. The various embodiments of the present application enable the system designer to locate system limiting functions in a "chiplet"—i.e., a customizable, memory side processor which optimizes various memory operations, depending on the predominant system usage cases without requiring the additional high cost of redesigning a memory chip fabrication process.

In many embodiments, such chiplets may be added to the DRAM die through the use of a silicon interposer, solder bumps or other high bandwidth chip interconnect technologies. Moreover, customizing memory through the use of chiplets permit logic optimized fabrication and testing for the chiplet and memory optimized fabrication for the DRAM memory. This may be desirable, as the optimum fabrication process for logic and memory are well known to be somewhat incompatible.

One Exemplary Transform Operation

Figure 5:
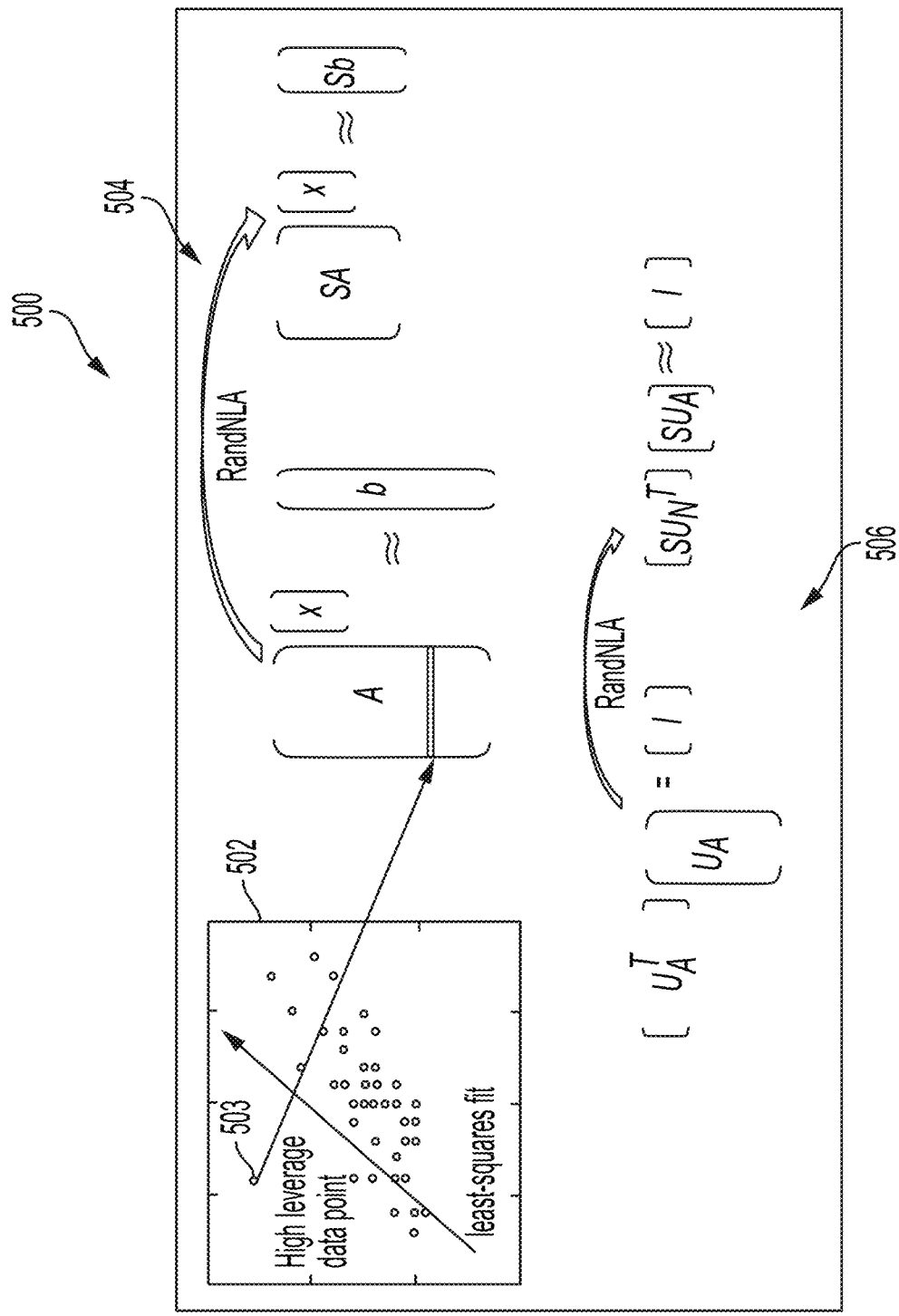
FIG. 5 shows one exemplary use case and/or algorithm that employs the memory controller as made in accordance with the principles of the present application.

For one example of a transform operation, FIG. 5 depicts one possible sketch transform operation that illustrates the present application. As mentioned, a useful sketch transform process proposes to use the idea of sketching or thumbnails of the data of interest. The sketch of the data may be a reduced representation of the data which summarizes one or more salient features of the blocks or flows of the data that flows through the memory controller. Simple examples might include the mean, variance, min/max, median, sub sampling, histograms, compression, encryption, neural networks, or more generally sketch transformations.

FIG. 5 depicts one aspect of sketch transformation that comes from the field of linear algebra as a consequence of the Johnson-Lindstrauss theorem is that a sketching matrix which consists of random elements result in a projection of the linear algebra problem to a lower dimensional subspace. The linear algebra projections solutions are known as random linear algebra (RandNLAProperties) such as clustering, similarity, as well as many of the above-mentioned matrix operations may be accomplished in a reduced dimensional domain by multiplying the data by appropriate sketch transforming matrices S as discussed below in the invention description. In this illustrative example the RandNLA algorithm for least-squares problems first computes sketch transform of matrices A and b, by multiplying them by S forming the reduced dimension versions SA and Sb, of the input data. These matrices solve a least-square problem in the sketched subspace to obtain a low-precision approximation. Alternatively, the sketch transformations are used to construct a traditional preconditioner for an iterative algorithm on the original input data to get high-precision approximations. For subspace-preserving embedding, if S is a random sampling matrix, then properties of a high leverage point (such as 503) will be preserved in SA. If S is a random-projection type matrix, then the information in the high leverage point may be homogenized or uniformized in SA.

Figure 6A:
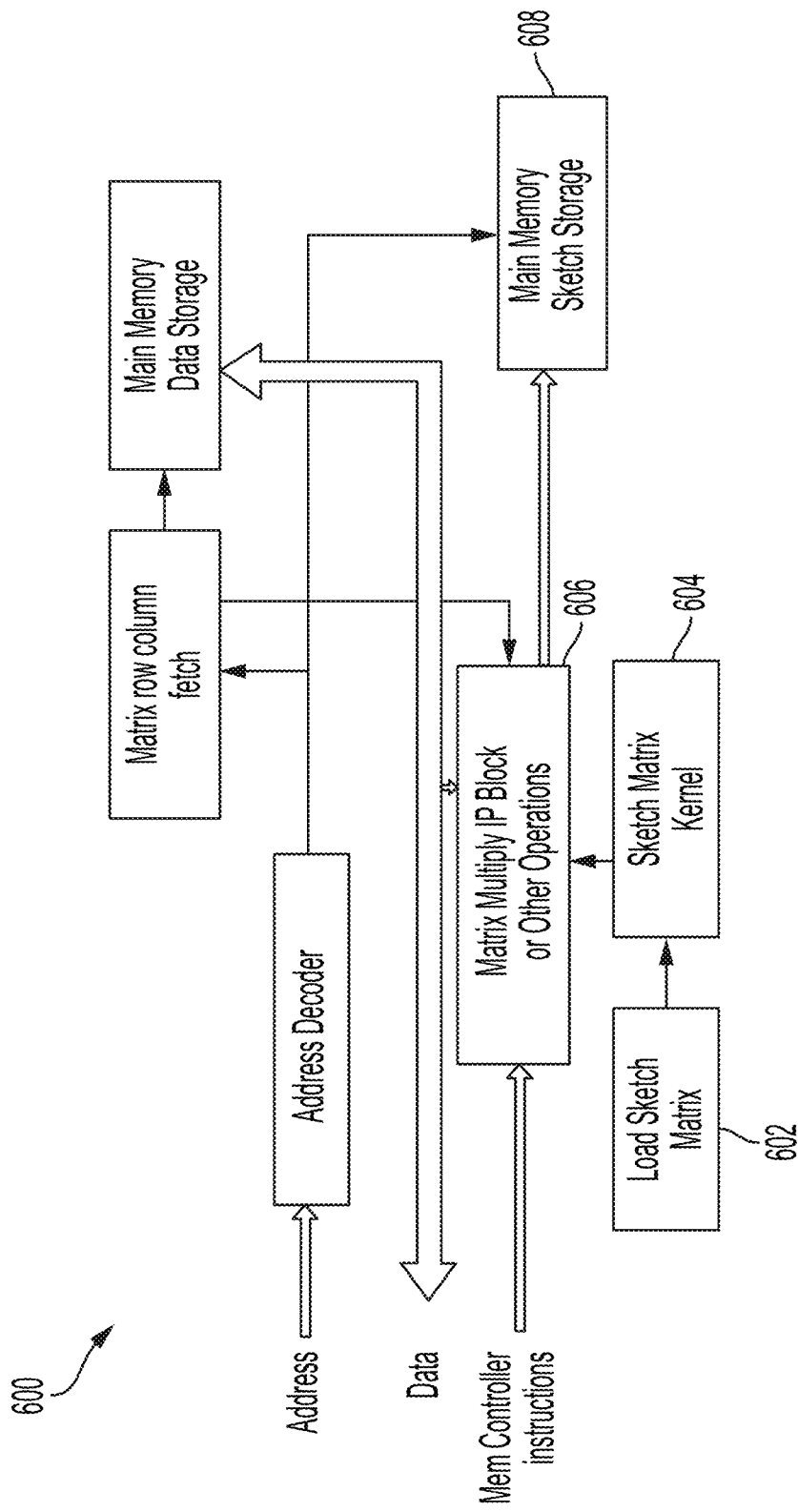
FIGS. 6A and 6B show two embodiments of how memory controllers of the present application can create transformations and using transforms, respectively—made in accordance with the principles of the present application.
Figure 6B:
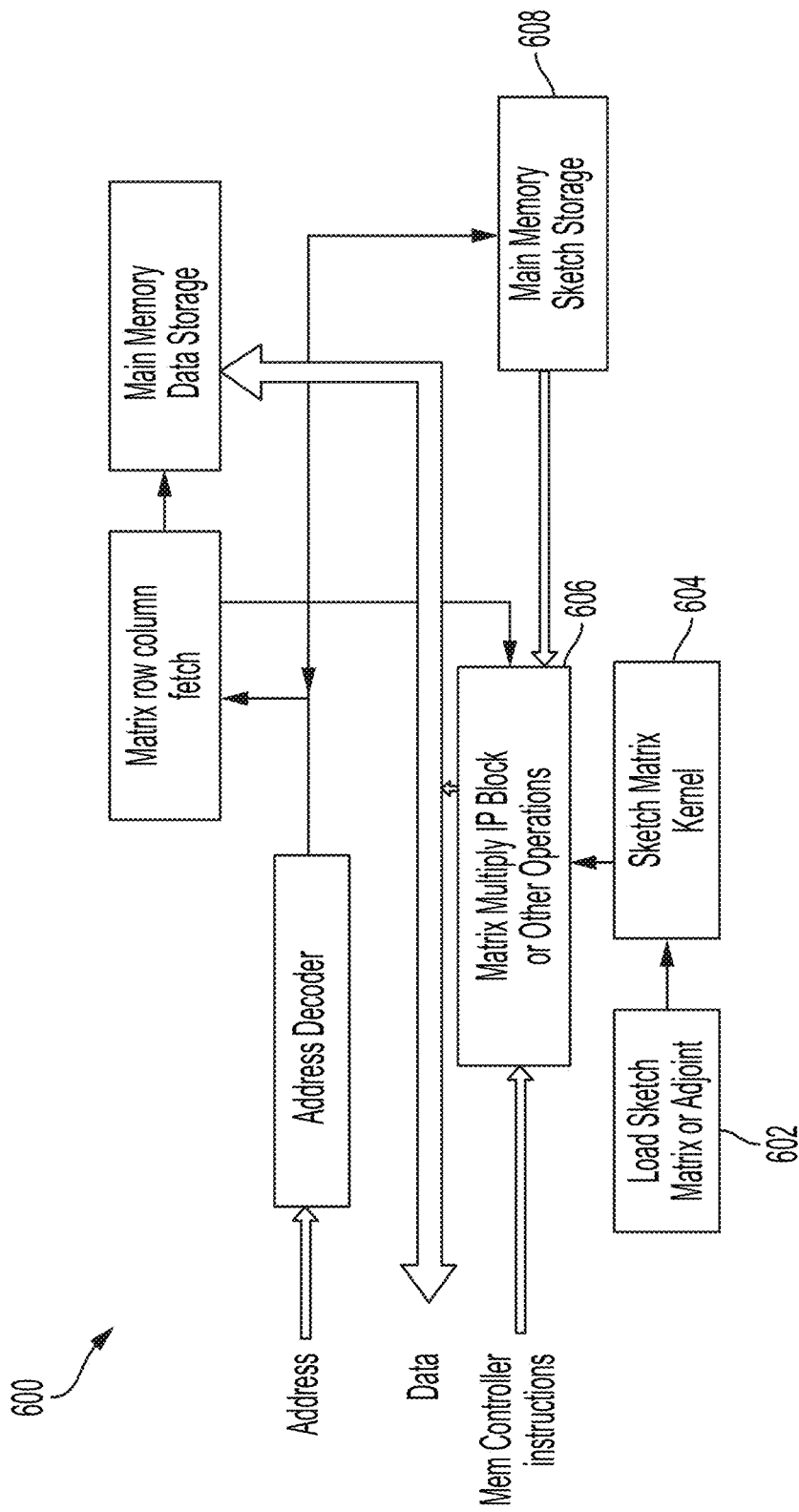

In 506, another example involves high dimensional matrix multiplications. Random linear algebra of unitary matrices may employ transform matrices, $SUa^T$ and $SUa$, as shown. For a subspace-preserving embedding, if Ua is an orthogonal matrix, then SUa is approximately orthogonal. It should be appreciated that many of the firmware/hardware embodiments described herein may be able to process such reduced linear algebra operations as described. Thus, by multiplying data by a sketching matrix as the data leaves or enters the memory can preserve much of the properties of the data in a reduced sketched form. Subsequent linear algebra operations can be rapidly approximated on the sketched data. Only if the full details of the data are required, will it be necessary to access all of the data and incurring the energy and access time costs FIGS. 6A and 6B are possible functional blocks of a memory controller for creating transforms and using transforms, respectively. As may be seen in FIG. 6A, transforming Memory Controller 600 creates data transforms as the memory flows to or from memory as controlled by the address. The transform matrix is prefilled with appropriate entries as discussed herein at blocks 602 and 604. The data is multiplied by the transform matrix at block 606 and the results are stored in the transform memory at block 608.

FIG. 6B depicts the architecture for using the transforms. The controller first operates on the transform memory in order to simplify and/or speed up the action required on the main memory. For merely one example, averaging can be done on the transform, or looking for elements in the matrix can first be done on the min max row/column transform, so only a few row/columns of the main memory may be accessed. The averages or cumulative sums may be computed by accessing the transforms (e.g., from block 608) rather than the main data memory. As the transforms are first accessed rather than accessing main memory, the time and/or energy to access the main memory is greatly reduced. This is the case—whether the entire computation is completed without access to the main memory, or whether the computation is eliminated and/or simplified.

In one embodiment, as the data flows to and from the main memory under the control of the address and address decoder, the data may be multiplied or other operations performed by the transform matrix. The transform matrix may be preloaded under the control of the memory controller instructions specifying the operations to be performed by the memory controller and where to store the results in the transform storage memory. Many exemplary architectures may be optimized for matrix/matrix or matrix tensor multiplication both dense or sparse and implemented as a transforming memory controller. For merely one embodiment, a FPGA block may be programmable and allow for a variant of functionality which would work well for flow processing, as a transform chiplet.

Several Exemplary Hardware Embodiments

Figure 7A:
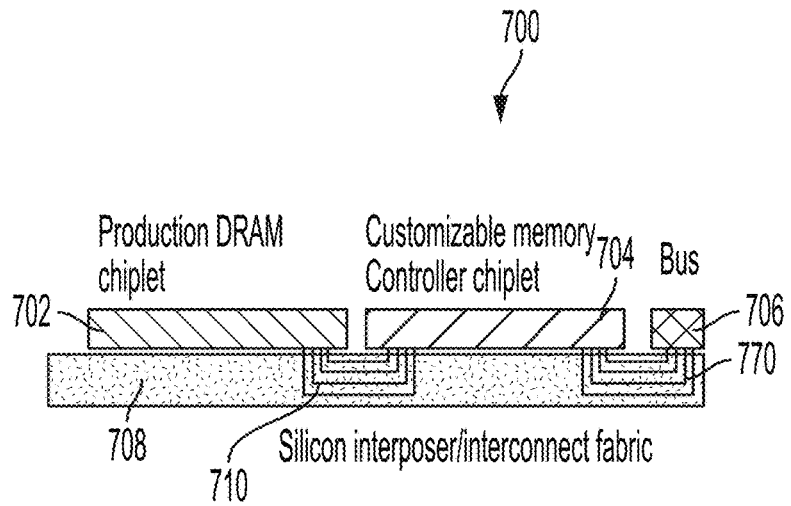
FIGS. 7A, B and C show different embodiments of memory controllers made in accordance with the principles of the present application.

FIGS. 7A, B and C depict several embodiments of hardware embodiments that may create and/or perform transform operations, as made in accordance with the principles of the present application. FIG. 7A is one such architecture 700. As may be seen, a memory controller chiplet 704 may be mechanically and/or electronically mated to a suitable substrate 708. Chiplet 704 may comprise logic circuits that affect transform operations as described herein. In proximity to chiplet 704, other memory elements (such as DRAM chip 702) may be so mated onto substrate 708. To affect the processing and data movement an interconnect fabric 710 may transport data to and from chiplet 704 (e.g., from DRAM 702 or onto bus 706).

Figure 7B:
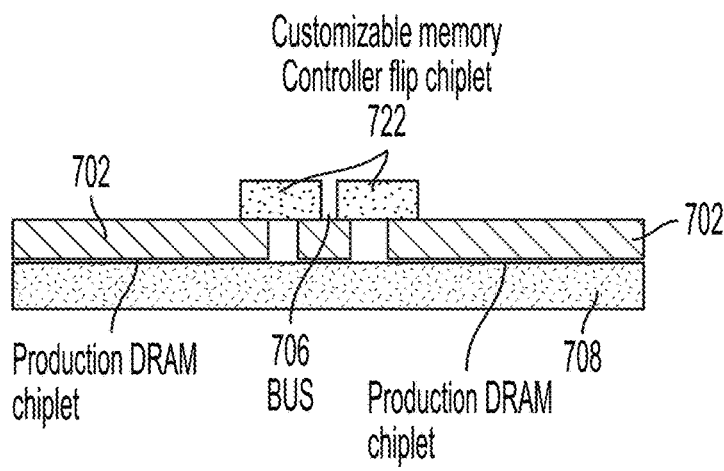
Figure 7C:
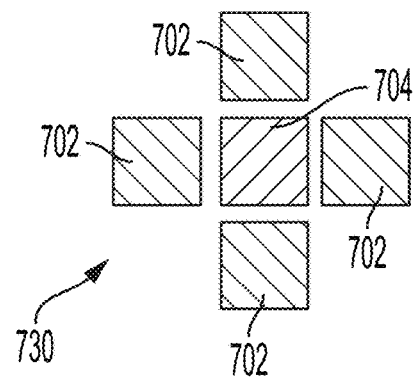

FIG. 7B depicts another embodiment of a hardware implementation (720). In this embodiment, transform operations may be affected by a set of memory controller chiplets 722. Chiplets 722 may be mechanically and/or electronically mated to both DRAM chips 702 and/or bus 706. In this embodiment, memory controller chiplets are in shorter communication pathways with either DRAM memory elements and/or the bus. FIG. 7C is a top view of yet another hardware implementation as made in accordance with the principles of the present application. As may be seen, memory controller chiplet 704 may be surrounded by memory elements 702 in a one-to-many communication/processing pathway.

In another embodiment, it should be appreciated that the transform memory controller could be made such that the set of logic elements are constructed integrally with a processor to comprise a System On a Chip (SOC). In yet another embodiment, the system may comprise a set of arithmetic units, a possible set of registers, and may some program memory so it has components of a processor (e.g., CPU, GPU, etc.) but may not have an entire set of processor logic. In some embodiments, the system may be constructed similar to a digital signal processing (DSP) unit which may convolve an input data stream with a kernel located in the DSP registers.

Figure 8:
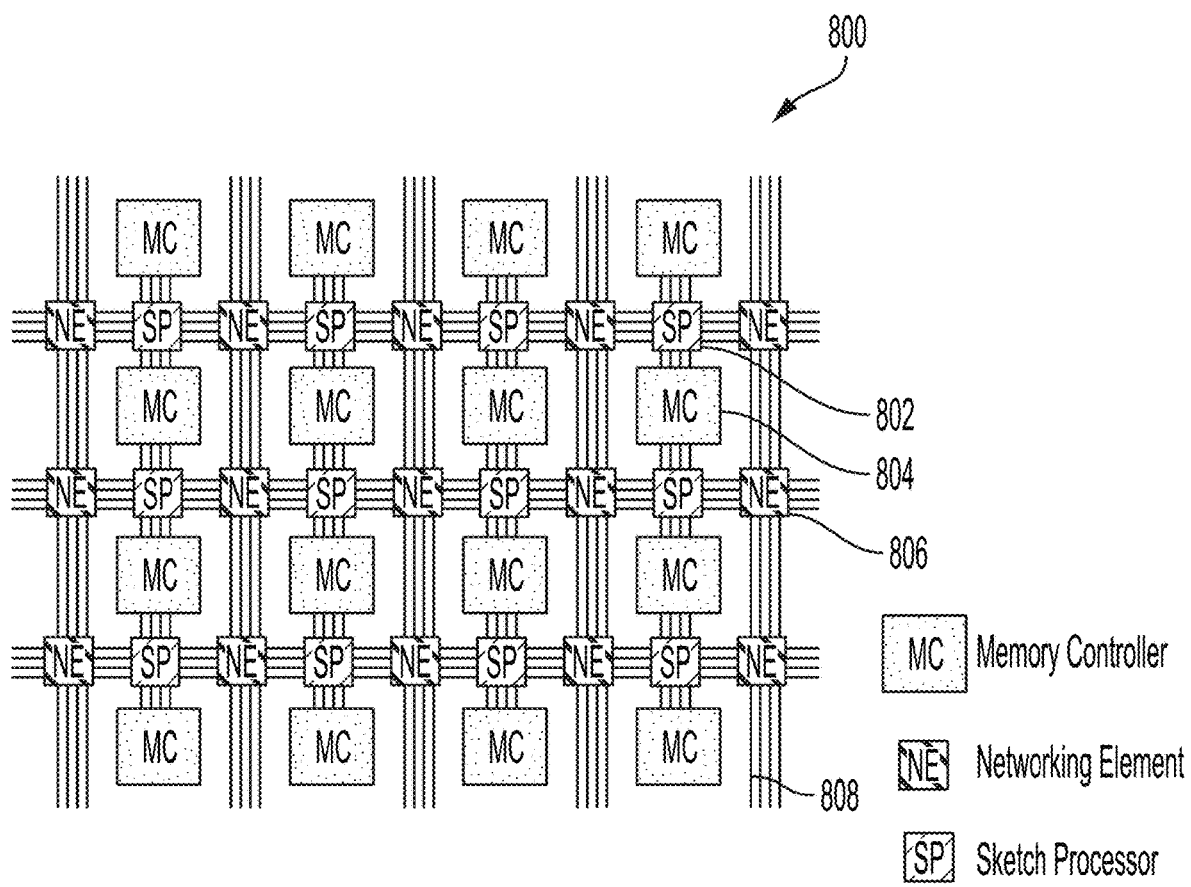
FIG. 8 is yet another embodiment of the memory controller made in accordance with the principles of the present application.

FIG. 8 is yet another embodiment of a hardware configuration as made in accordance with the principles of the present application. As may be seen from this top view, a set of transform processors 802 may be in electronic communications with both network elements 806 and memory controllers 802. A suitable bus structure 808 may be implemented to affect efficient movement of data between the various elements.

Several Exemplary Transform Operation Embodiments

Figure 9:
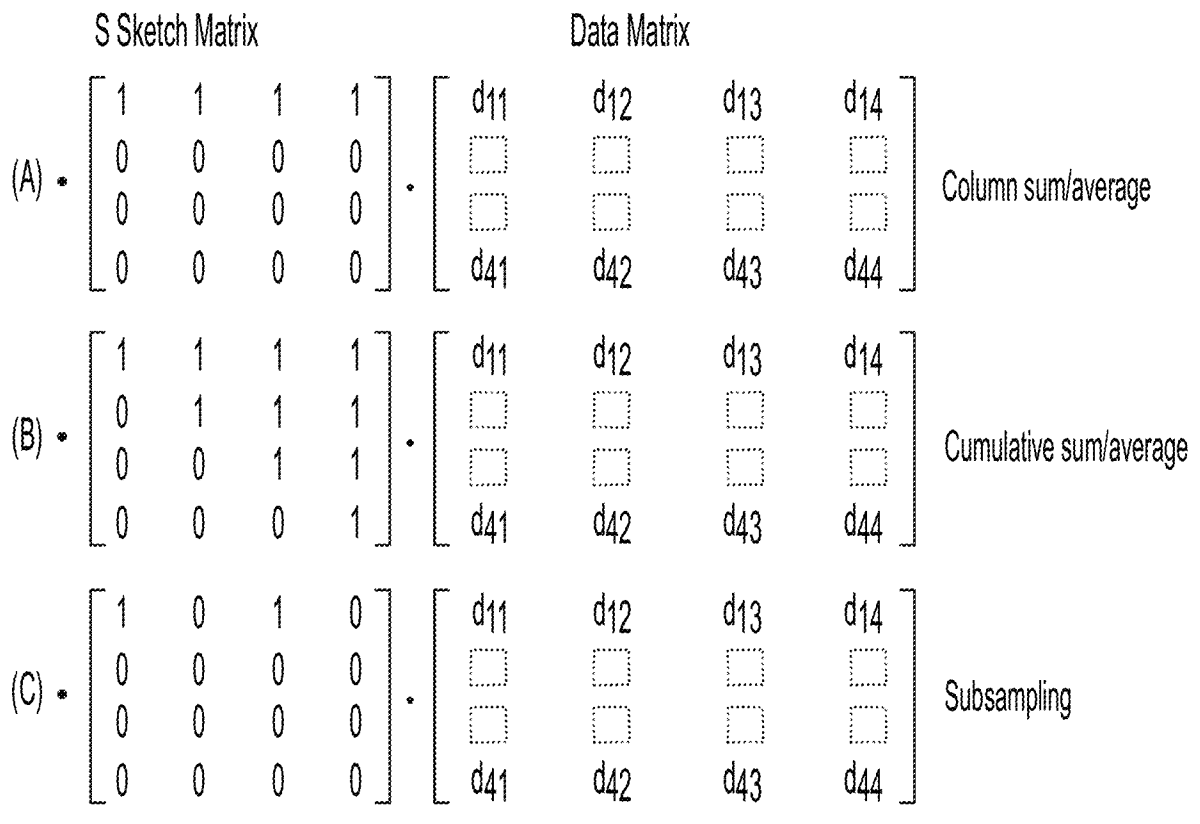

FIGS. 9A, 9B 9C, 10 and 11A and B depict several embodiments of transform processes/operations that may be affected by the architectures described herein. FIG. 9A shows one transform matrix that can perform column sum/average on the data matrix as shown. FIG. 9B shows another transform matrix that may perform cumulative sums/averages. FIG. 9C shows yet another transform matrix that may perform a subsampling operation on a data matrix as shown. In this case, a reduced size thumbnail of the data can be obtained which can be used for search. Once the search list has been reduced using the thumbnails, a search on the complete detailed data will require substantially less data I/O from memory. It will be appreciated that other transform matrices may be implemented to perform efficient computation on data.

Figure 10:
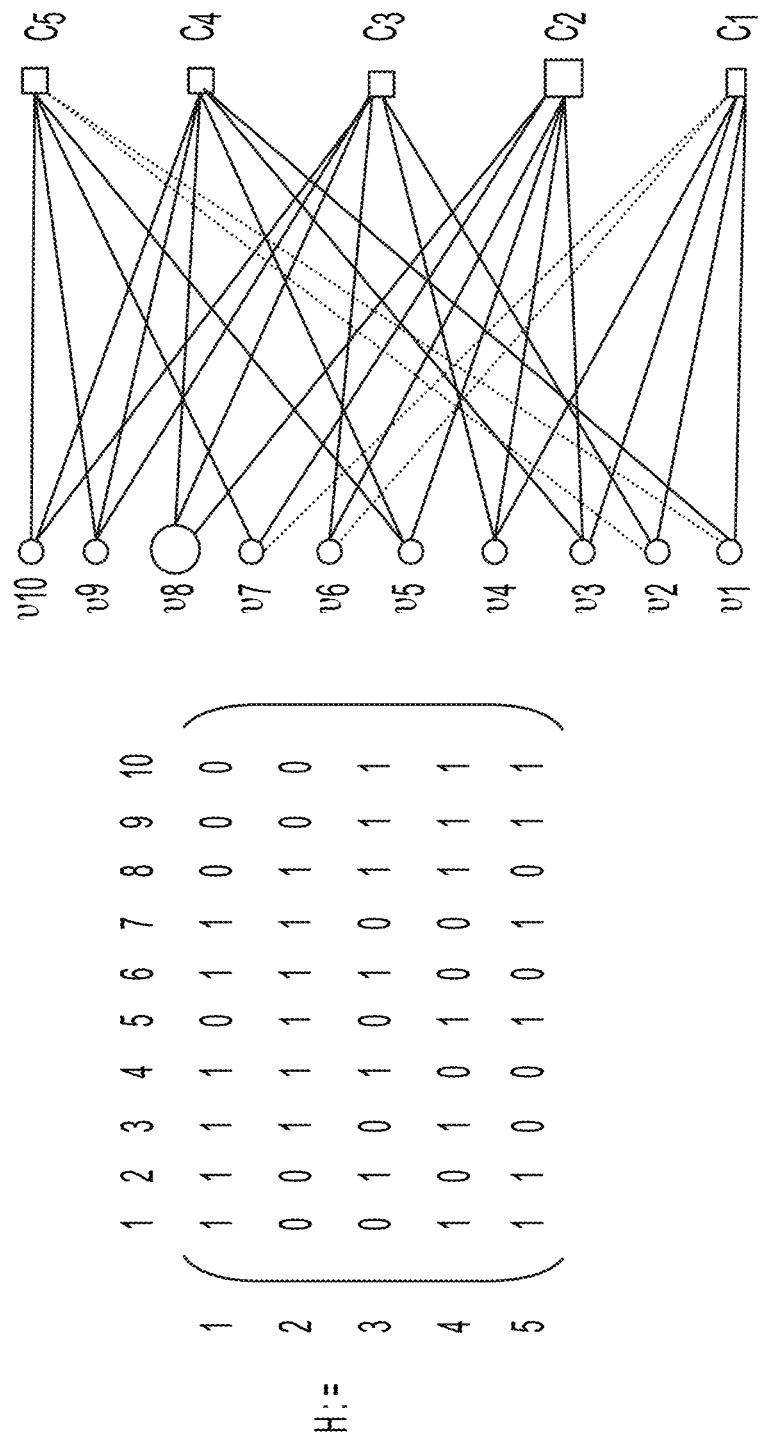
FIG. 10 is another possible application/algorithm that uses the memory controllers of the present application.

FIG. 10 illustrates the use of transforming to create a low-density parity check (LDPC) code. Convolution against random binary matrices may give a number of relations which can be used to determine if there is an error and which element must be corrected. As may be seen, the H matrix may suffice as a parity-check matrix—and the corresponding Tanner graph is shown. In one example, the data may be multiplied by a series of random binary vectors. If a bit is in error, the data vector may no longer be in the null space of the transforming matrix and the error may be often uniquely corrected with probability guarantees.

Figure 11A:
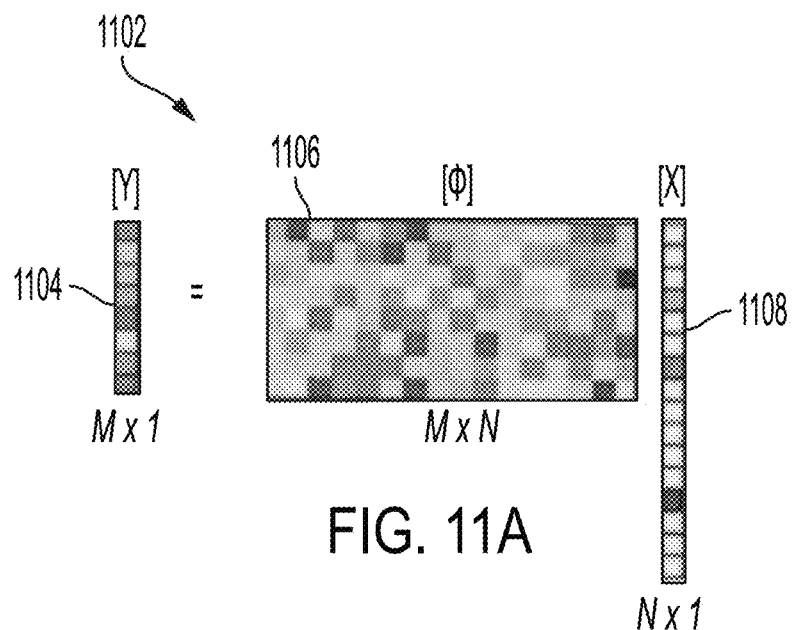
FIGS. 11A and 11B are views of yet another possible application/algorithm that uses the memory controllers of the present application.
Figure 11B:
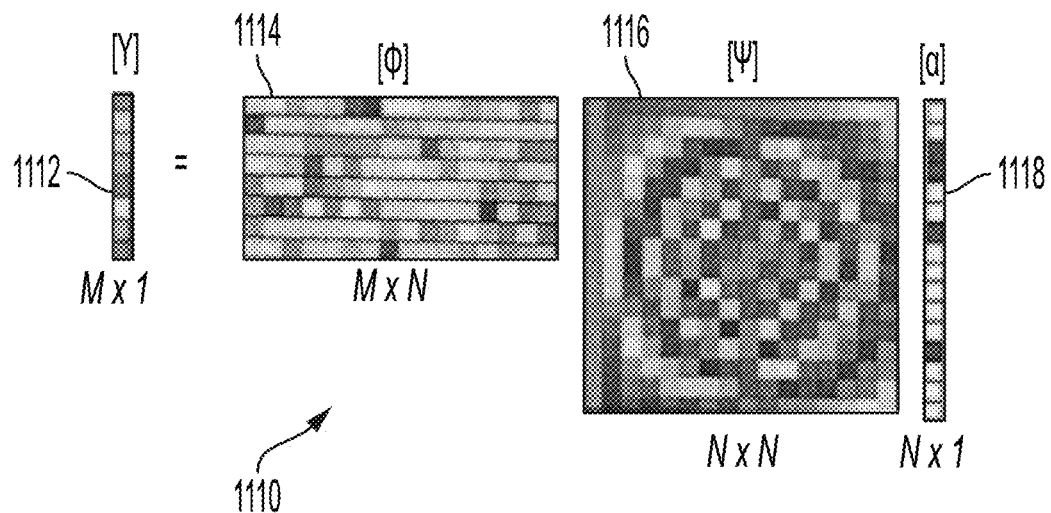

FIGS. 11A and B depict one embodiment affecting a compressed sensing operation, as an encoder (1102) and a decoder (1110), respectively. As may be seen, encoder 1102 multiplies a signal vector vector X (1108)—which may have zero signal elements (seen as white boxes)—with a measurement array 1106 φ. This measurement or transformation array has a restricted isometry property and can, for example, consist of random numbers. The result, vector 1104 is sent. In decoder 1110, an estimate of the sparse vector 1118 ($\alpha$) can be solved by minimizing the L1 norm of 1118 ($\alpha$) subject to the constraint that the observation vector 1114 is equal to the product of the measurement array 1106 times dictionary matrix 1116 ($\Psi$) which can be a Fourier transform matrix and a sparse vector 1118 ($y=\phi\Psi\alpha$). An estimate of X (1108) is obtained by solving for the product the dictionary array 1116 times the sparse estimate vector 1118 ($x=\Psi\alpha$). As for previous problems, the fundamental operation required is a transformation matrix times the input data to the memory which in this case may arrive from an external data source.

ENUMERATED EMBODIMENTS

EE1: In a computer system comprising a central processor and a hierarchy of computer memory elements and further comprising a transform memory controller, the transform memory controller performing operations on data residing in desired levels of slower memory elements, a method for performing transform operations on data residing in desired levels of slower memory elements, the steps of said method comprising:
  receiving an instruction for an operation on data in the computer system;
  determining the cost of the operation on the data to be performed at the central processor; and
  if the cost of the operation is above a desired threshold, then performing the data operation at the transform memory controller instead of at the central processor.

EE 1.2: The method of EE1 wherein the step of receiving an instruction further comprises determining whether the instructions is among a set of instructions that are predetermined to be performed at the transform memory controller.

EE 1.3: The method of EE1 the step of determining the cost of the operation on the data to be performed at the central processor is a function of the energy consumption of the received instruction to be performed at the central processor of the computer system.

EE1.4: The method of EE1 the step of determining the cost of the operation on the data to be performed at the central processor is a function of the time delay of the received instruction to be performed at the central processor of the computer system.

EE2: A transform memory controller, the controller being a part of a computer system further comprising a processor and a hierarchy of computer memory elements, the transform memory controller comprising:
  an input, the input receiving data signals associated with the computer memory elements;
  a set of logic elements, the set of logic elements configured to perform a transform operation on the data signals associated with the computer memory element wherein the transform operation performs a desired computation on the data signals without the need of the desired computation being performed by the processor of the computer system; and
  and an output, the output of the transform operation sends results of the computation to the computer memory elements.

EE2.1: The transform memory controller of EE2 wherein:
  the set of logic elements comprise a chiplet, said chiplet configured to be in electronic communications with neighboring computer memory elements.

EE2.2: The transform memory controller of EE2.1 wherein:
  the chiplet is mechanically mated to a substrate, the substrate comprising computer memory elements mechanically mated to the substrate.

Now that various embodiments have been herein disclosed, it is also to be appreciated that any one or more of the particular tasks, steps, processes, methods, functions, elements and/or components described herein may suitably be implemented via hardware, software, firmware or a combination thereof. In particular, various modules, components and/or elements may be embodied by processors, electrical circuits, computers and/or other electronic data processing devices that are configured and/or otherwise provisioned to perform one or more of the tasks, steps, processes, methods and/or functions described herein. For example, a controller, a processor, computer or other electronic data processing device embodying a particular element may be provided, supplied and/or programmed with a suitable listing of code (e.g., such as source code, interpretive code, object code, directly executable code, and so forth) or other like instructions or software or firmware, such that when run and/or executed by the controller, processor, computer or other electronic data processing device one or more of the tasks, steps, processes, methods and/or functions described herein are completed or otherwise performed. Suitably, the listing of code or other like instructions or software or firmware is implemented as and/or recorded, stored, contained or included in and/or on a non-transitory computer and/or machine readable storage medium or media so as to be providable to and/or executable by the computer or other electronic data processing device. For example, suitable storage mediums and/or media can include but are not limited to: floppy disks, flexible disks, hard disks, magnetic tape, or any other magnetic storage medium or media, CD-ROM, DVD, optical disks, or any other optical medium or media, a RAM, a ROM, a PROM, an EPROM, a FLASH-EPROM, or other memory or chip or cartridge, or any other tangible medium or media from which a computer or machine or electronic data processing device can read and use. In essence, as used herein, non-transitory computer-readable and/or machine-readable mediums and/or media comprise all computer-readable and/or machine-readable mediums and/or media except for a transitory, propagating signal.

Optionally, any one or more of the particular tasks, steps, processes, methods, functions, elements and/or components described herein may be implemented on and/or embodiment in one or more general purpose computers, special purpose computer(s), a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA, Graphical card CPU (GPU), or PAL, or the like. In general, any device, capable of implementing a finite state machine that is in turn capable of implementing the respective tasks, steps, processes, methods and/or functions described herein can be used.

A detailed description of one or more embodiments of the application, read along with accompanying figures, that illustrate the principles of the application has now been given. It is to be appreciated that the application is described in connection with such embodiments, but the application is not limited to any embodiment. The scope of the application is limited only by the claims and the application encompasses numerous alternatives, modifications and equivalents. Numerous specific details have been set forth in this description in order to provide a thorough understanding of the application. These details are provided for the purpose of example and the application may be practiced according to the claims without some or all of these specific details. For the purpose of clarity, technical material that is known in the technical fields related to the application has not been described in detail so that the application is not unnecessarily obscured.

The invention claimed is:

1. A transform memory controller, the controller being a part of a computer system further comprising a processor and a hierarchy of computer memory elements which are all accessed by the processor using read by address or content or write by address or content, the transform memory controller comprising:
   an input, the input receiving data signals from at least one of the computer memory elements which is accessed by the transform memory controller using read by address or content separate from access of the computer memory element by the processor;
   a set of logic elements, the set of logic elements configured to perform a at least one transform operation on the data signals received by the input, wherein the transform operation performs a desired computation on the data signals without the desired computation being performed by the processor of the computer system; and
   an output, the output of the transform operation sends results of the desired computation to at least one of the computer memory elements which is accessed by the transform memory controller using write by address or content separate from access of the computer memory element by the processor.

2. The transform memory controller of claim 1 wherein:
   the set of logic elements comprise a chiplet, said chiplet configured to be in electronic communications with neighboring computer memory elements in the hierarchy.

3. The transform memory controller of claim 2 wherein:
   the chiplet is mechanically mated to a substrate, the substrate comprising the neighboring computer memory elements mechanically mated to the substrate.

4. The transform memory controller of claim 3 wherein the chiplet is in electronic communications with the neighboring computer memory elements via an interconnect fabric.

5. The transform memory controller of claim 3 wherein the substrate further comprises a communication bus, the bus providing communications between the chiplet and the neighboring computer memory elements.

6. The transform memory controller of claim 3 wherein the neighboring computer memory elements further comprises DRAM elements.

7. The transform memory controller of claim 1 wherein said set of logic elements are constructed integrally with the processor to comprise a System On a Chip (SOC).

8. The transform memory controller of claim 1 wherein the processor of the computer system is one of a group, the group comprising of at least one of a Central Processing Unit (CPU), a Graphics Processing Unit (GPU).

9. The transform memory controller of claim 8 wherein the transform operation to be performed on the data signals comprises a computation on data of a desired size at the transform memory controller instead of the data signals being transferred to the processor of the computer system.

10. The transform memory controller of claim 9 wherein the computer system is configured to have the transform memory controller perform a transform operation on data signals that have a desired threshold of energy cost, if performed by the processor of the computer system.

11. The transform memory controller of claim 9 wherein the computer system is configured to have the transform memory controller perform a transform operation on data signals that have a desired threshold of time delay, if performed by the processor of the computer system.

12. The transform memory controller of claim 1 wherein one of the transform operations comprises a random linear algebra (RandNLA) operation.

13. The transform memory controller of claim 12 wherein the RandNLA operation comprises a sketching matrix that performs a projection of a linear algebra problem to a lower dimensional subspace.

14. The transform memory controller of claim 12 wherein the RandNLA operation comprises performing a least-square computation in a sketched subspace.

15. The transform memory controller of claim 1 wherein one of the transform operations comprises subsampling operations on a data matrix.

16. The transform memory controller of claim 15 wherein the subsampling operation on a data matrix comprises a search of a data list, the subsampling operation employing reduced size thumbnails of the data matrix.

17. A transform memory controller being a part of a computer system further comprising a processor and a hierarchy of computer memory elements, the transform memory controller comprising:
   an input of a transform chiplet operatively coupled to at least one computer memory element in a hierarchy of computer memory elements including main memory which are all accessed by the processor using at least one of read by address, read by content, write by address, write by content, or any combination, the at least one computer memory element being accessed by the transform memory controller using read by address or content under control of memory address and address decoder and separate from the processor;
   a set of logic elements in the transform chiplet coupled to transform storage memory via a high bandwidth chip interconnect fabric, the transform storage memory comprising at least one computer memory element in the hierarchy, the set of logic elements configured to perform a transform operation on data signals received by the input wherein the transform operation performs a desired computation on the data signals storing results in the transform storage memory without the desired computation being performed by the processor of the computer system; and
   an output of the transform chiplet operatively coupled to at least one computer memory element in the hierarchy, thereby sending results of the transform operation to the at least one computer memory element in the hierarchy which is accessed by the transform memory controller using write by address or content under control of memory address and address decoder and separate from the processor.

18. A transform memory controller in a computer system, comprising:
   an input of a transform chiplet, the input receiving data signals from at least one computer memory element in a hierarchy of computer memory elements including main memory which are all accessed by a processor, comprising at least one of a Central Processing Unit (CPU), a Graphics Processing Unit (GPU), or both, of the computer system using at least one of read by address, read by content, write by address, write by content, or any combination, at least one computer memory element in the hierarchy being accessed by the transform memory controller using read by address or content separate from access of the computer memory element by the processor;

a set of logic elements operatively coupled to a transform storage memory comprising at least one computer memory element in the hierarchy, the transform storage memory includes at least one DRAM element mechanically and/or electronically coupled to the transform chiplet via short communication pathways based on a high bandwidth chip interconnect that reduces delay in transferring data signals between the transform storage memory and the transform memory controller, the set of logic elements configured to perform a transform operation including a RandNLA operation that comprises a sketching matrix, on the data signals received by the input wherein the transform operation performs a projection of a linear algebra problem to a lower dimensional subspace on the data signals while storing, at least in part, results of the transform operation in the transform storage memory, without the transform operation being performed by the processor; and an output of the transform chiplet, the output sends the results of the transform operation from the transform chiplet, via short communication pathways based on a high bandwidth chip interconnect that reduces delay in transferring the results, to the main memory which is accessed by the transform memory controller using write by address or content separate from access of the main memory by the processor.

* * * * *